United States Patent
Blanch et al.

(10) Patent No.: US 7,974,993 B2
(45) Date of Patent: Jul. 5, 2011

(54) APPLICATION LOADER FOR SUPPORT OF VERSION MANAGEMENT (75) Inventors: Robert Blanch, Clyde Hill, WA (US); Srinivasan Parthasarathy, Redmond, WA (US); Jesper Olsen, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1246 days.

(21) Appl. No.: 11/633,250

(22) Filed: Dec. 4, 2006

(65) Prior Publication Data
US 2008/0133590 A1    Jun. 5, 2008

(51) Int. Cl.
*G06F 7/00* (2006.01)

(52) U.S. Cl. ........ 707/806; 717/168; 717/170; 717/172; 717/174; 717/178

(58) Field of Classification Search .................. 707/168, 707/806
See application file for complete search history.

(56) References Cited

U.S. PATENT DOCUMENTS

| | | | | |
|---|---|---|---|---|
| 5,815,661 A | 9/1998 | Gosling | | 709/216 |
| 5,875,435 A | 2/1999 | Brown | | |
| 5,978,834 A | 11/1999 | Simonoff | | 709/203 |
| 6,052,527 A | 4/2000 | Delcourt | | 717/138 |
| 6,078,322 A | 6/2000 | Siminoff et al. | | 345/744 |
| 6,101,328 A * | 8/2000 | Bakshi et al. | | 717/170 |
| 6,119,130 A * | 9/2000 | Nguyen et al. | | 707/695 |
| 6,363,362 B1 | 3/2002 | Burfield et al. | | |
| 6,370,682 B1 | 4/2002 | Eckardt | | 717/141 |
| 6,529,909 B1 | 3/2003 | Bowman-Amuah | | |
| 6,665,677 B1 | 12/2003 | Wotring et al. | | |
| 6,671,853 B1 | 12/2003 | Burkett et al. | | |
| 6,725,453 B1 * | 4/2004 | Lucas et al. | | 717/178 |
| 6,810,429 B1 | 10/2004 | Walsh et al. | | |
| 6,826,568 B2 | 11/2004 | Bernstein et al. | | |
| 6,826,750 B1 * | 11/2004 | Curtis et al. | | 717/170 |
| 6,853,997 B2 | 2/2005 | Wotring et al. | | |
| 6,862,616 B1 | 3/2005 | Tompkins | | 709/223 |
| 6,862,735 B1 | 3/2005 | Slaughter | | 719/315 |
| 6,898,604 B1 | 5/2005 | Ballinger et al. | | |
| 6,986,148 B2 | 1/2006 | Johnson, Jr. | | 719/332 |
| 7,013,306 B1 | 3/2006 | Turba et al. | | |
| 7,031,956 B1 | 4/2006 | Lee et al. | | |

(Continued)

FOREIGN PATENT DOCUMENTS

WO    WO 01/20504    3/2001

(Continued)

OTHER PUBLICATIONS

The OpenOffice.org Source Project, Sun Microsystems, Inc., 2000, pp. 1-35.

(Continued)

*Primary Examiner* — Don Wong
*Assistant Examiner* — Binh V Ho
(74) *Attorney, Agent, or Firm* — Westman, Champlin & Kelly, P.A.

(57) ABSTRACT

A system for supporting version management is provided. The system includes a first application having a plurality of versions. Each of the plurality of versions is associated with a separate a version-specific assembly. A loader is configured to load one of the version-specific assemblies, the assembly then being utilized as a basis for deriving an object from a database associated with the first application. The object is provided to a second application, typically in response to a corresponding request.

11 Claims, 5 Drawing Sheets

U.S. PATENT DOCUMENTS

| | | | |
|---|---|---|---|
| 7,065,560 B2* | 6/2006 | Erickson et al. | 709/219 |
| 7,069,562 B2 | 6/2006 | Kushnirskiy et al. | 719/328 |
| 7,130,863 B2 | 10/2006 | Diab | |
| 7,158,967 B1 | 1/2007 | Turba et al. | |
| 7,158,990 B1 | 1/2007 | Guo et al. | |
| 7,178,142 B2* | 2/2007 | Bennett et al. | 717/168 |
| 7,194,679 B1 | 3/2007 | Green | |
| 7,418,456 B2 | 8/2008 | Charlet et al. | |
| 7,441,185 B2 | 10/2008 | Coulson et al. | |
| 7,458,073 B1* | 11/2008 | Darling et al. | 717/168 |
| 7,539,701 B2 | 5/2009 | Sethi | |
| 7,779,402 B2* | 8/2010 | Abernethy et al. | 717/168 |
| 2002/0019972 A1 | 2/2002 | Grier et al. | 717/122 |
| 2002/0078437 A1* | 6/2002 | Grassman et al. | 717/168 |
| 2002/0156814 A1 | 10/2002 | Ho | |
| 2003/0018658 A1 | 1/2003 | Suermondt et al. | |
| 2003/0046317 A1 | 3/2003 | Cseri et al. | |
| 2003/0097433 A1 | 5/2003 | Park | 709/222 |
| 2003/0130845 A1 | 7/2003 | Poplawski | |
| 2003/0159135 A1* | 8/2003 | Hiller et al. | 717/166 |
| 2003/0192036 A1 | 10/2003 | Karkare | 717/158 |
| 2003/0216990 A1 | 11/2003 | Star | |
| 2004/0044965 A1 | 3/2004 | Toyama et al. | |
| 2004/0049736 A1 | 3/2004 | Al-Azzawe et al. | |
| 2004/0054626 A1 | 3/2004 | Fuentes | |
| 2004/0143791 A1 | 7/2004 | Ito et al. | |
| 2004/0153462 A1 | 8/2004 | Bardwell | |
| 2004/0181753 A1 | 9/2004 | Michaelides | |
| 2004/0199876 A1 | 10/2004 | Ethier et al. | |
| 2004/0230569 A1 | 11/2004 | Rys et al. | |
| 2004/0249762 A1* | 12/2004 | Garibay et al. | 705/59 |
| 2005/0022154 A1 | 1/2005 | Chung et al. | |
| 2005/0060284 A1 | 3/2005 | Ruby et al. | |
| 2005/0065942 A1 | 3/2005 | Diab | |
| 2005/0097504 A1 | 5/2005 | Ballinger et al. | |
| 2005/0102370 A1 | 5/2005 | Lin et al. | |
| 2005/0108627 A1 | 5/2005 | Mireku | |
| 2005/0144622 A1 | 6/2005 | Ballinger et al. | |
| 2005/0240467 A1 | 10/2005 | Eckart et al. | |
| 2005/0273709 A1 | 12/2005 | Lough et al. | |
| 2006/0080289 A1 | 4/2006 | Brunswig et al. | |
| 2006/0117061 A1 | 6/2006 | Weiss | |
| 2006/0161912 A1* | 7/2006 | Barrs et al. | 717/170 |
| 2006/0168513 A1 | 7/2006 | Coulson et al. | |
| 2006/0184918 A1 | 8/2006 | Rosaria et al. | |
| 2006/0190814 A1 | 8/2006 | Collie et al. | |
| 2006/0218160 A1 | 9/2006 | Bhatia | |
| 2006/0230339 A1 | 10/2006 | Achanta et al. | |
| 2006/0235862 A1 | 10/2006 | Heuer et al. | |
| 2007/0005622 A1 | 1/2007 | Fernandes et al. | |
| 2007/0083538 A1 | 4/2007 | Roy et al. | |
| 2007/0112714 A1 | 5/2007 | Fairweather | |
| 2007/0192679 A1 | 8/2007 | Foushee, Jr. et al. | |
| 2007/0271305 A1 | 11/2007 | Chandrasekar et al. | |
| 2007/0294684 A1* | 12/2007 | Kumashiro et al. | 717/168 |
| 2008/0065978 A1 | 3/2008 | Francker et al. | |
| 2008/0098291 A1 | 4/2008 | Bradley et al. | |
| 2008/0134019 A1 | 6/2008 | Wake et al. | |
| 2009/0112902 A1 | 4/2009 | Sthanikam et al. | |

FOREIGN PATENT DOCUMENTS

| | | |
|---|---|---|
| WO | WO 01/57613 | 8/2001 |
| WO | WO 2006/032063 | 3/2006 |

OTHER PUBLICATIONS

Official Action dated Oct. 15, 2009 in related U.S. Appl. No. 11/530,073, filed Sep. 8, 2006, 29 pgs.

Official Action dated May 10, 2010 in related U.S. Appl. No. 11/530,073, filed Sep. 8, 2006, 33 pgs.

Final Office Action dated Oct. 26, 2010 in related U.S. Appl. No. 11/530,073, filed Sep. 8, 2006, 49 pgs.

Title: Overview of the XML and Binary Converter, Author: Ed Lai. Date: Jul. 2006 URL: http://www.datamech.com/XMLForm/aboutXmlAndBinary.html, pdf attached with associated dates of each web pages accessed.

Title : BizTalk 2004 Flat File Schema Author: Tomas Restrepo. Date: Jun. 23, 2006. Url: www.winterdom.com/dev/bts/BTSFFSchemaTut1.html.

Serialization/Deserialization in .NET Author: Mark Strawmyer. Date: Nov. 18, 2003 Url: www.codeguru.com/columns/dotnet/print.php/c5821.

Title: Fast Infoset Author: Paul Sandoz, Alessando Triglia, Santiago Pericas-Geertsen, Date: Jun. 2004. Url: java.sun.com/developer/technicalArticles/xml/fastinfoset.

Official Action dated Oct. 1, 2008 for U.S. Appl. No. 11/601,951, filed Nov. 20, 2006, 11 pgs.

Notice of Allowance dated Mar. 10, 2009 for U.S. Appl. No. 11/601,951, filed Nov. 20, 2006, 13 pgs.

Bhushan, B. et al.; "Federal Accounting Management System for Architecture for Multimedia Service Usage Management," Appeard in MMNS Jul. 22, 2002 Proceedings. 13 pgs.

Written Opinion and PCT International Search Report dated Feb. 19, 2008, for International Serial No. PCT/US2007/079579, filed Sep. 26, 2007. Search Report—3 pgs; Written Opinion, 5 pgs.

Eder & Frank, Johann & Heinz. "Use and Reuse of Databases," Proceedings of the 3rd Conference on Re-engineering of Information Systems, Bled, Slovenia, 1994.

* cited by examiner

APPLICATION LOADER FOR SUPPORT OF VERSION MANAGEMENT

BACKGROUND

Currently, some business-oriented applications are configured to support some level of implementation by a separate, external application. For example, certain accounting applications provide functionality that is made accessible to users of a separate, external application, such as a customer management application. Conceivably, this extension of functionality could also or alternatively go in the other direction, for example, where functionality of a customer management application is made accessible to users of an accounting application.

A first application configured to implement functionality of a second application can run into problems when a new version of the second application is released. For example, the first application may not be configured to completely support the new version of the second application. In many cases, the first application must be updated or re-released to accommodate the new version of the second application.

Taken in the context of an external application configured to implement functionality of a business application, the external application can run into problems when newer versions of the business application are released. For example, a new version of the business application may support new functionality and/or a database schema that are unfamiliar or unrecognizable to the external application. Under circumstances such as these, it is currently not uncommon for the external application to be updated or re-released to accommodate the release of one or more version updates.

The discussion above is merely provided for general background information and is not intended for use as an aid in determining the scope of the claimed subject matter.

SUMMARY

A system for supporting version management is provided. The system includes a first application having a plurality of versions. Each of the plurality of versions is associated with a separate a version-specific assembly. A loader is configured to load one of the version-specific assemblies, the assembly then being utilized as a basis for deriving an object from a database associated with the first application. The object is provided to a second application, typically in response to a corresponding request.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

Figure 1:
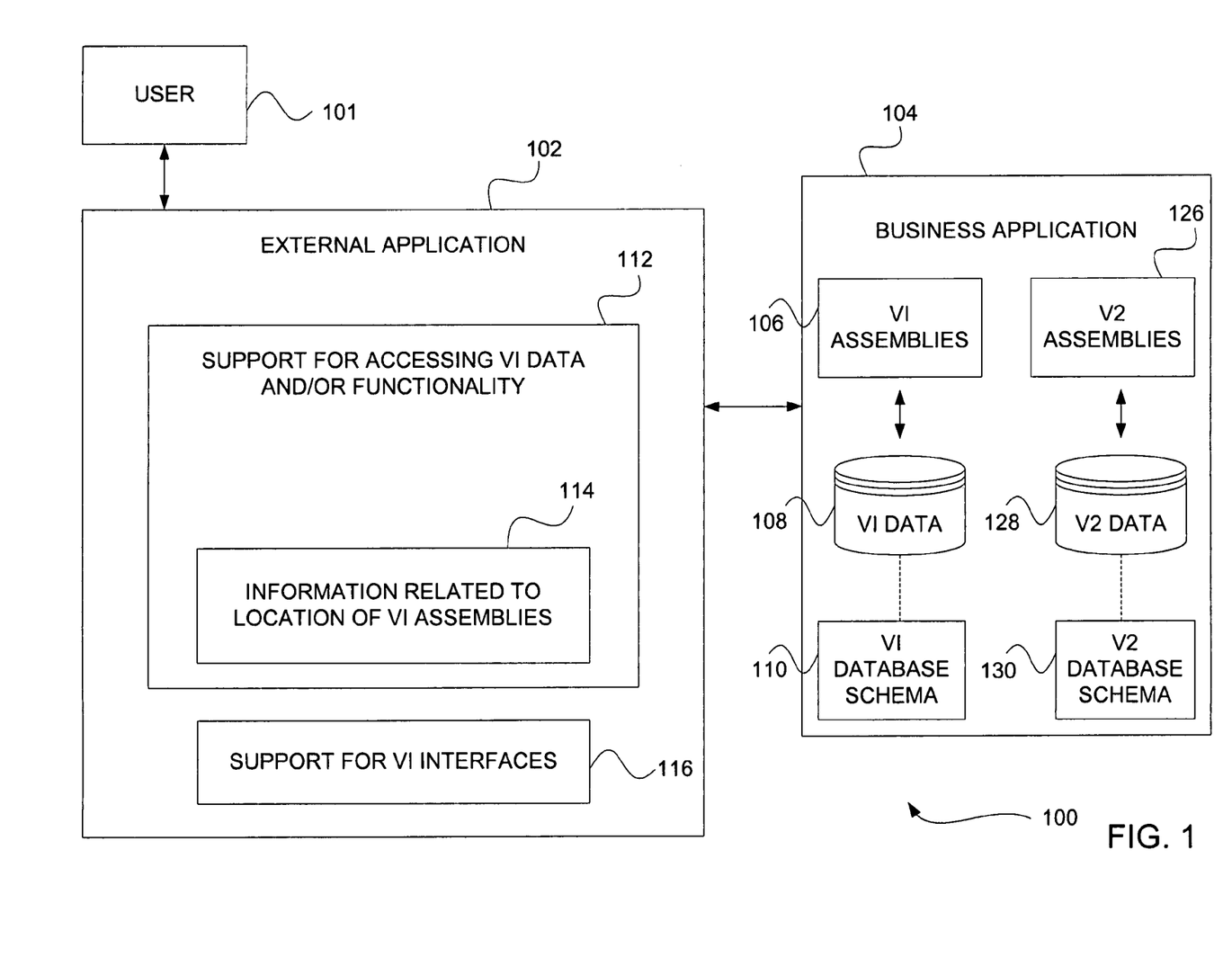
FIG. 1 is a schematic diagram of an application environment.

FIG. 1 is a schematic diagram of an application environment 100. Environment 100 includes an application 102 (e.g., a software application) that is "external" in that it is separate in some way from a business application 104 (e.g. another software application). Business application 104 is configured to provide at least some functionality to a user 101 of application 102. In one embodiment, certainly not by limitation, application 104 is an accounting application that provides accounting-oriented functionality that is made accessible to user 101 through application 102. In one embodiment, also not by limitation, application 102 is a customer relationship management application.

The precise implementation of applications 102 and 104, at least in terms of the computing device or hardware environment from which each application is made accessible, is not critical to the present invention. Both applications may be made accessible from the same computing device. Each application may be accessible from a separate device. One application may operate on a client machine with the other made accessible on a server machine. Communication between the applications may be local in nature or may be remotely accomplished through any network means such as, but not limited to, a local area network, a wide area network, or, more specifically, the Internet. The noted options are not provided by limitation but instead are provided simply to reinforce that all variations are to be considered within the scope of the present invention.

For the purpose of illustration, it is assumed that a first version (V1) of business application 104 was released and subsequently followed by release of a second version (V2). It is also assumed that, to the extent that application 102 provides access to functionality associated with application 104, that access extends to V1 features but falls short of complete access to V2 features. For example, it might be that only V1 was available when application 102 was constructed. Under these circumstances, application 102 is less than likely to have been equipped with full support for all V2 features.

Application 104 is shown in FIG. 1 to include a plurality of V1 assemblies 106 configured to support access to V1 data 108 and/or certain V1 functionality. At least a portion of data 108 illustratively reflects (e.g., is formatted in accordance with) a V1 database schema 110. A plurality of V2 assemblies 126 are configured to support access to V2 data 128 and/or certain V2 functionality. At least a portion of data 128 illustratively reflects (e.g., is formatted in accordance with) a V2 database schema 130. It should be noted that different versions of application 104 need not necessarily implement different database schema. The contrast in schemas is provided as an example of what might not be supported by application 102 as application 104 changes from one version to the next. It is also worth mentioning briefly that all assemblies described herein could be alternatively implemented such as, but not limited to, a scenario wherein the assemblies are implemented from within the external application.

External application 102 includes support 112 for accessing V1 data and/or functionality. As is shown, support 112 includes information 114 related to the location(s) where V1 assemblies 106 are located. External application 102 also includes support 116 for V1 interfaces such as, but not necessarily limited to, user interface components associated with the first version of business application 104. External application 102 lacks complete support for accessing V2 data and/or functionality, and also lacks support for at least some V2 interfaces.

Accordingly, the first version of business application 104 illustratively supports functionality and/or a database schema that are at least partially unfamiliar or unrecognizable to external application 102. As a remedy, application 102 could be updated or re-released to accommodate the release of the second version of application 104. For example, application 102 could be updated with support for V2 interfaces and/or support for accessing V2 data types and/or functionality, including information related to the location(s) of V2 assemblies 126. This is one way to address version updating. A different remedy will now be described in relation to FIG. 2.

Figure 2:
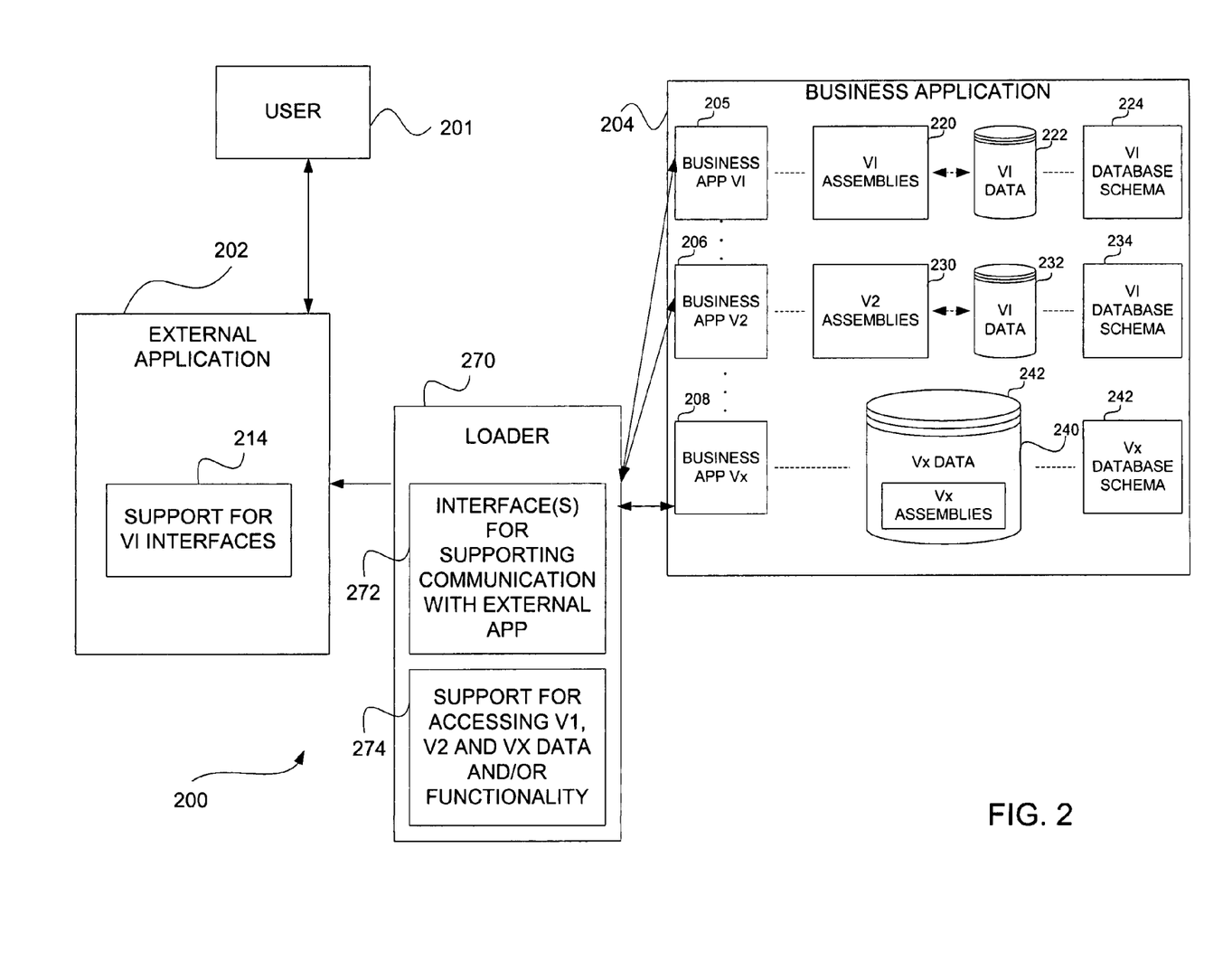
FIG. 2 is a schematic diagram of another application environment.

FIG. 2 is a schematic diagram of an application environment 200 that is, in some ways, similar to, but certainly different than, environment 100. Environment 200 includes an application 202 (e.g., a software application) that is "external" in that it is separate in some way from a business application 204 (e.g. another software application). Business application 204 is configured to provide at least some functionality to a user 201 of application 202. In one embodiment, certainly not by limitation, application 204 is an accounting application that provides accounting functionality that is made accessible to user 201 through application 202. In one embodiment, also not by limitation, application 202 is a customer relationship management application. Similar to applications 102 and 104, the precise implementation of applications 202 and 204, at least in terms of the computing device or hardware environment from which each application is made accessible, is not critical to the present invention.

For environment 200, it is assumed that a first version (V1) of business application 104 was released and subsequently followed by release of a second version (V2), which was then followed by a release of "x" additional versions, where the variable x generally represents an unlimited number of additional versions. Within FIG. 2, block 205 generally represents the first version of application 204, block 206 represents the second version and block 208 represents additional versions. It is also assumed that, to the extent that application 202 provides access to functionality associated with application 204, that access extends to V1 features but falls short of complete access to V2 and VX features. For example, it might be that only V1 was available when application 202 was constructed. Under these circumstances, application 202 is less than likely to have been equipped with full support for all V2 and VX features.

The first version of application 204 (block 205) is shown in FIG. 2 to include a plurality of V1 assemblies 220 configured to support access to V1 data 222 and/or certain V1 functionality. Data 222 illustratively reflects (e.g., is formatted in accordance with) a V1 database schema 224. A plurality of V2 assemblies 230 are configured to support access to V2 data 232 and/or certain V2 functionality. Data 232 illustratively reflects (e.g., is formatted in accordance with) a V2 database schema 234.

A plurality of VX assemblies 240 are incorporated into a collection of VX data 242. This alternate configuration is intended to demonstrate that any of the described assemblies (e.g., 220, 230, etc.) can be, contrary to their depiction in the drawings, incorporated into a database, such as, but not limited to, their associated version database. Assemblies 240 are configured to support access to VX data 242 and/or certain VX functionality. Data 242 illustratively reflects (e.g., is formatted in accordance with) a VX database schema 244. Different versions of application 204 need not necessarily implement different database schema. The contrast in schemas is simply provided as an example of what might not be supported by application 202 as application 204 changes from one version to the next.

In contrast to system 100, system 200 includes a loader 270. Loader 270 is a mechanism configured to support integration of an external application with business application 204. Loader 270 enables an entity, such as an independent software vendor, to integrate with application 204 on a version-independent basis.

Loader 270 includes communication interfaces 272 that support communication with an external application, such as, in the illustrated example, application 202. It is through interfaces 272 that the external application gains access to a support component 274, which is, generally speaking, a way to access application 204 data and/or functionality in a generally version-independent manner. In one embodiment, support component 274 includes information related to the location or locations where V1 assemblies 220, V2 assemblies 230 and VX assemblies 240 are stored. In another embodiment, support component 274 includes means for accessing information related to the location or locations where the assemblies are stored (e.g., the location information is stored outside of the loader itself). The assemblies themselves include methods for the retrieval of data from databases 222, 232 and 242, respectively. Such methods might include, but certainly are not limited to, methods geared toward launching forms, launching reports, creating entities, saving entities, etc.

A given set of application 204 assemblies (e.g., one of assemblies 220, 230 or 240) is illustratively compatible with previous versions of the application interfaces. For example, V2 assemblies 230 are compatible with V1 interfaces 214. Application 204 objects can therefore be cast in accordance with any version of interfaces up to the present or latest version.

Accordingly, in one embodiment, external application 202 can be compiled using any version of the application 204 interfaces. Then, when application 204 objects are instantiated, there is no need for application 202 to know the location and version of the application 204 assemblies. Instead, loader 270 is configured to retrieve the assemblies that are associated with the relevant database or databases. When loader 270 returns an object that it has instantiated from the assembly that corresponds to the applicable database version, that object can be cast by application 202 in accordance with the latest available version of the application 204 interfaces (only V1 interfaces 214 are available in the illustrated case). Thus, the loader abstracts away from finding an "appropriate" version and enables application 202 to connect to any version of application 204 without having to recompile and/or re-release application 202.

Figure 3:
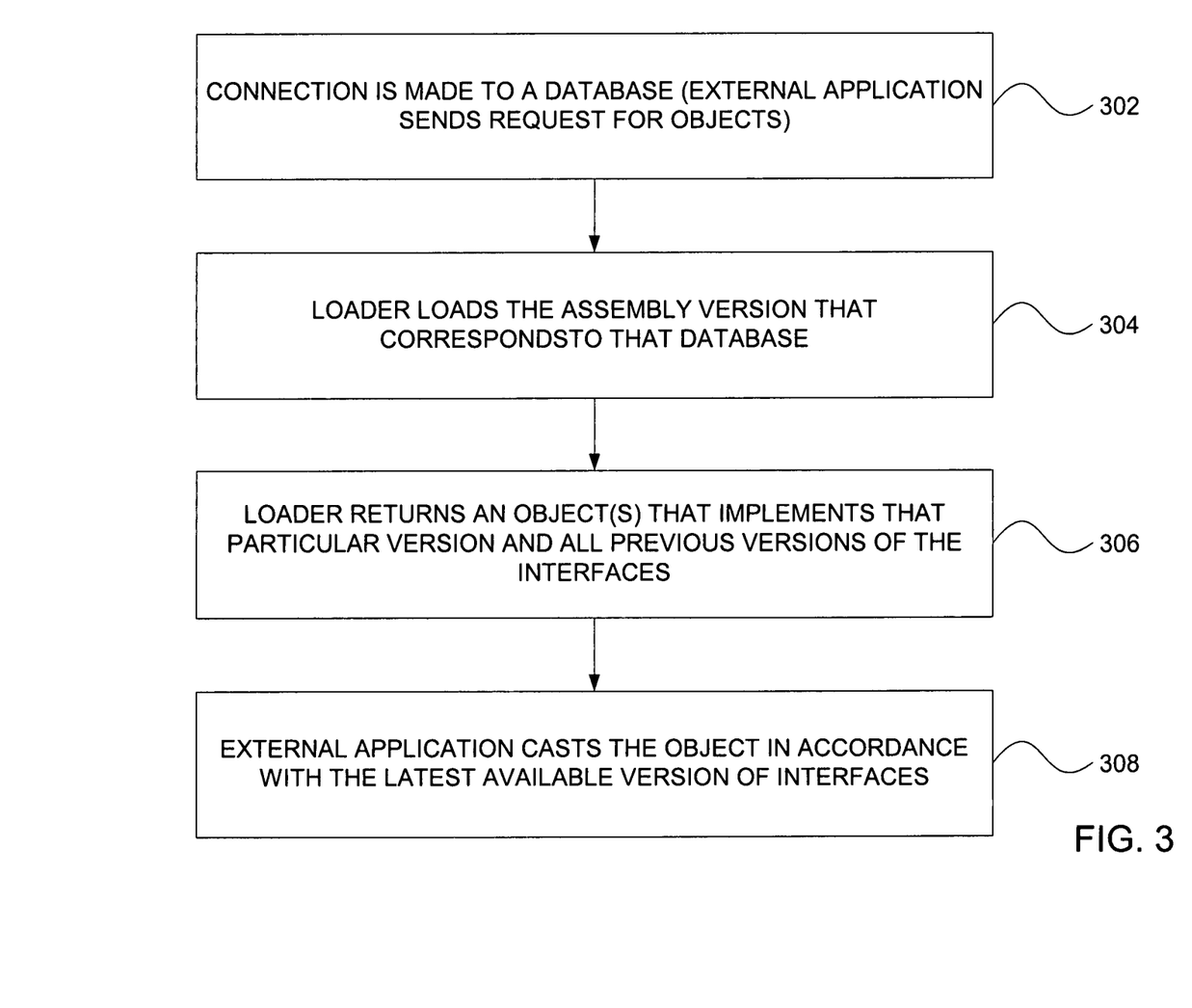
FIG. 3 is a flow chart diagram demonstrating steps associated with implementation of an application loader.

FIG. 3 is a flow chart diagram demonstrating steps associated with the described implementation of an application loader. In accordance with block 202, a connection is made to a database (e.g., database 222, 232 or 242). In one embodiment, the connection is made in association with a request by application 202 to loader 270 for application 204 objects. In accordance with block 304, loader 270 loads the assembly version (e.g., from assemblies 220, 230 or 240) that corresponds to the same database. In accordance with block 306, loader 270 returns an object that implements the same version and all previous versions of the application 204 interfaces. Finally, in accordance with block 308, application 202 casts the object in accordance with the latest available version of the application 204 interfaces, which in the illustrated case means V1 interfaces 214.

An additional example may help to further one's understanding of the described application loader and related functionality. One can imagine a scenario wherein an external application (i.e., a calling application) is built during the timeframe of a second version of a business application with which the loader is affiliated. The external application illustratively is statically bound to V1 and V2 interfaces and does not 'know' anything about future methods (V3+). However, further methods will support the V1 and V2 interfaces.

To continue the example, the external application now uses the loader to connect to a database associated with a third version of the business application. The loader locates and loads related V3 assemblies. The loader then returns objects from these assemblies. The returned objects can be cast to any of the V1, V2 or V3 interface versions. Since the calling application (i.e., the external application) is only binding to V1 and V2 interfaces, it can only cast to V1 and V2 and use the methods from these versions.

In yet another example, a calling application (i.e., an external application) is built during the timeframe of a third version of a business application with which the loader is affiliated. The external application illustratively is statically bound to V3 interfaces and does not 'know' anything about V1 or V2 interfaces. The external application now uses the loader to connect to a database associated with a second version of the business application. The loader locates and loads related V2 assemblies. The loader then returns objects from these assemblies. The returned objects implement only V1 or V2 interface versions. If the calling application tries to cast the returned objects to V3 interfaces, it will illustratively fail (e.g., triggering an invalid cast exception) because the object do not implement V3 interfaces. In one embodiment, the external application is equipped to respond to this cast conflict. In one embodiment, a type check is performed prior to casting in order to anticipate and address problems that may arise.

For obvious reasons, the functionality of loader 270 is dependent on having access to appropriate assemblies. In accordance with one embodiment, loader 270 is configured to trigger an exception in instances where the assembly version required for a given database cannot be located (e.g., when that particular version of the business application has not been installed). In one embodiment, the calling application (i.e., the external application) is configured to catch those exceptions and obtain (e.g., through use of the loader) a redistributable package that will install the required version.

In one embodiment, when the business application is updated (e.g., when a new version is released), loader 270 need not be significantly changed, or even changed at all. For example, after a new version is registered, loader 270 may automatically discover and implement it. For example, in one embodiment, loader 270 is configured to access a listing of available versions and/or a listing of where associated assemblies are located. Therefore, extending the functionality of loader 270 may be as simple as adding new version information to the listing or listings, rather than making substantial changes to the loader itself. This is not to say that the loader cannot be updated, it simply can be configured to require little or no updating upon each new release.

In accordance with one embodiment, a loader such as loader 270, is distributed by a sponsor of a business application as a software utility. The loader is made available, for example, to a person or entity that plans to develop an external application designed to integrate with the business application. In one embodiment, the loader is independent of the business application such that new version of the loader can be released independent of the business application. Applications that use the loader illustratively bind to the loader interface (e.g., interfaces 272) rather than the actual loader in order to be abstracted from subsequent implementation changes.

Figure 4:
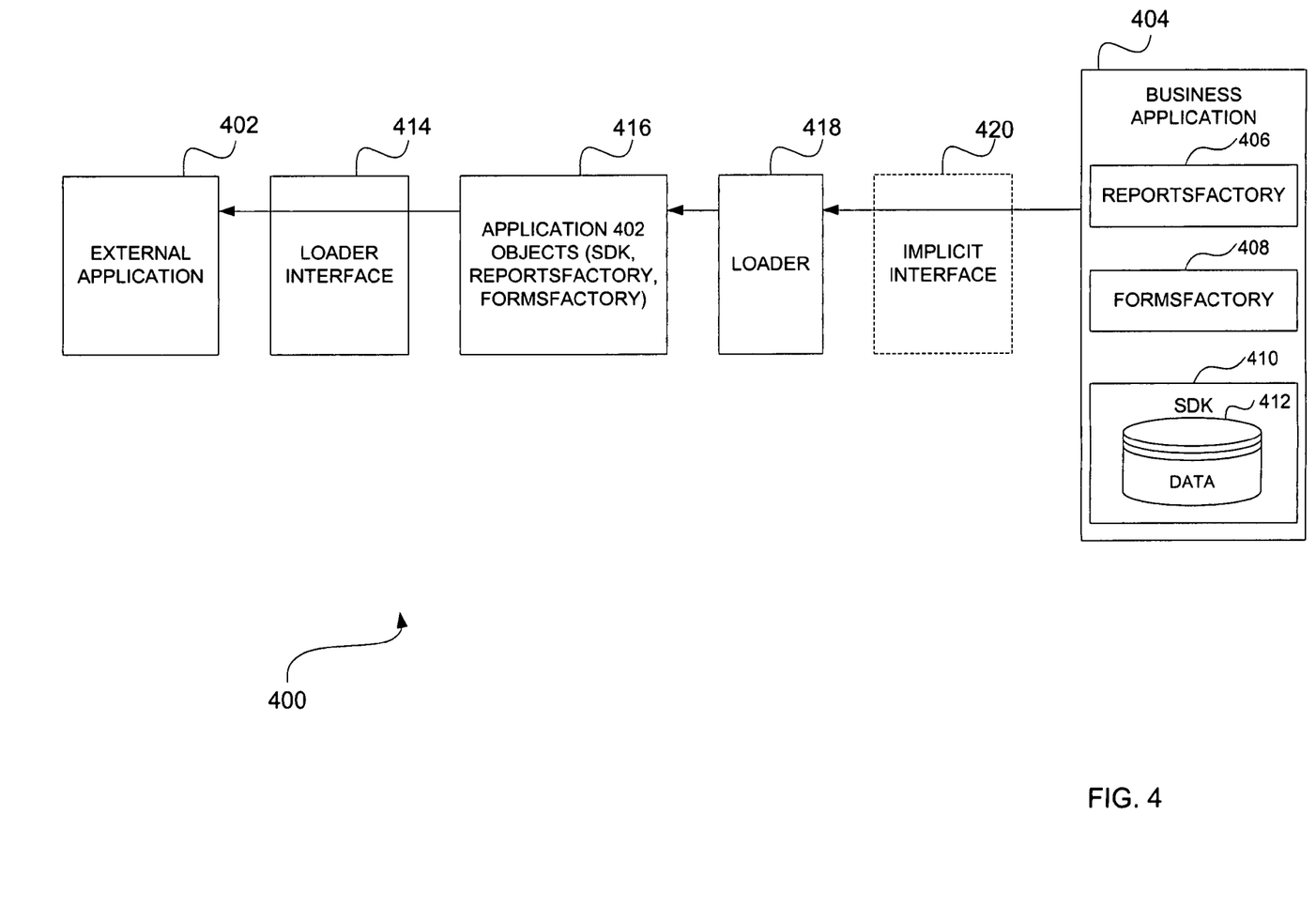
FIG. 4 is a schematic diagram of an application system architecture.

FIG. 4 is a schematic diagram of an application system architecture 400 that is, in large part, consistent with application environment 200 described in relation to FIG. 2. Certainly architecture 400 is consistent in that includes an application 402 that is "external" in that it is separate in some way from a business application 404. Architecture 400 also includes a loader 418 configured to support version-independent interaction between applications 402 and 404 in a manner similar to that described in relation to loader 270. A loader interface 414 is provided and, like interfaces 272, is configured to support communication between an external application and the loader.

Architecture 400 differs from environment 200 in that it shows an implicit interface 420 between application 404 and loader 418. Interface 420 represents the methods and means for supporting communication between loader 418 and application 404. The interface is shown as being "implicit" because it need not necessarily be a set of formal interfaces. The interaction between loader 418 and application 404 dos not necessarily require such a channel of communication.

Architecture 400 also differs from environment 200 in that business application 404 is shown to include a reports factory 406, a forms factory 408 and a software development kit (SDK) 410. Components 406, 408 and 410 are illustratively associated with assemblies exposed to loader 418. The SDK 410 is illustratively configured to support a developer of an external application (e.g., application 402) in terms of accomplishing an integration of application 404 functionality. Application objects 416 are derived from the reports factory 406, the forms factory 408, SDK 410 and/or a database of application data 412. Objects 416 are passed, in response to calls from application 402, by loader 418, through interface 414, to application 402 in a manner consistent with the application independent processing described in relation to FIGS. 2 and 3 (e.g., loader accesses and utilizes appropriate assemblies, etc.).

Those skilled in the art will appreciate that there are many different ways in which the described loader mechanism can be installed, implemented, maintained, etc. The present description will now turn to a set of specific examples. Of course, these examples are provided in the spirit of providing a complete explanation of the present invention. Those skilled in the art will appreciate that the scope of the present invention extends well beyond the specific examples provided herein.

In accordance with one embodiment, utilization of a loader as described herein begins with loading a loader assembly and obtaining a loader object. In one embodiment, certainly not by limitation, the loader assembly is installed to the Global Assembly Cache (GAC) and is loaded by its strong name.

Once installed, the loader can illustratively be used to connect to any database associated with the business application affiliated with the loader. The loader will then, as described herein, facilitate the return appropriate version-specific objects. The loader interface illustratively provides a method for retrieving the assemblies (e.g., the forms factory assemblies, the reports factor assemblies, etc.) for a given database. In one embodiment, the method also has overloads that take a configuration-object or the database and server name. The calling application will call the loader to get the business application objects.

In accordance with one embodiment, the loader is not strongly bound to any version of the affiliated business application and returns objects directly without type casting them. The calling application illustratively type-checks and casts the objects appropriately.

In one embodiment, the loader implements a LoaderException class. Since the loader is calling methods on the business application objects themselves it can illustratively throw both LoaderExceptions and BusinessApplicationExceptions. Since calling applications should not be binding statically to the loader assembly or business application assemblies but only to the interface assemblies, they illustratively will catch ApplicationExceptions when using the loader and then type cast it to either SmallBusinessExceptions or LoaderExceptions.

In one embodiment, certainly not by limitation, the LoaderExceptions are defined by the following:

```
LoaderErrorCases enum:
    /// Empty database or server name
    EmptyDataBaseName
    /// Runtime version for the database not found on the local machine
    RunTimeVersionNotFoundOnLocalMachine
    /// Sql error while connecting to the database
    SqlErrorConnectingToDatabase
    /// Unknown exception while attempting to connect
    UnknownErrorWhileConnectingToDB
    /// The version of Business Application does not support this method.
    NotSupportedByRequestedVersion
    /// Not a database asspcoated with Business Application
    DatabaseIsNotRightTypeOfDatabase
    /// Invalid usage - null param not allowed
    NullParameterNotAllowed
    /// possibly invalid version
    InvalidDatabaseVersion
    /// Security error when accessing file.
    UnauthorizedFileAccess
    /// Disk error when accessing file.
    FileAccessError
    /// Error when creating file.
    FileCreateError
    /// Security exception.
    SecurityException
    /// The specified database does not contain any redistributable
    BusinessAppRedistributableNotPresent
    /// Runtime locale for the database not found on the local machine
    RunTimeLocel enotFoundOnLocalMachine
```

As has been alluded to herein, a database generally can only be opened by a version of the business application that supports the same schema version. So when connecting to a given database the loader illustratively provides methods for retrieving a redistributable package that can be installed by the user (or the calling application). In one embodiment, a calling application can get the redistributable by calling a method of the interface that creates the file locally and returns the full path. It is then up to the application to launch a process and run the package or message to the user where to install the package from.

A simple example of how the loader is used will now be provided. The example assumes that the application assembly is statically bound to the loader interface assembly (ILoader.dll) and all business application assemblies of the desired version (BussAppIAPI.dll, BussAppIU.dll, etc.). It should be noted that "SmallBusinessInstance" is an example of a business application assembly. The example is as follows:

```
// First load the assembly that Contains the loader object
Assembly loaderAssembly = Assembly.Load("Loader,
Version=2.0.5201.0, Culture=neutral,
PublicKeyToken=31bf3856ad364e35");
// Create an instance of the loader class
ILoader loader = loaderAssembly.CreateInstance("Loader", false,
BindingFlags.CreateInstance,
null, null, null, null) as ILoader;
string configurationFile = "C:\\MyFolder\\MyCompany.sbc";
// Get the SmallBusinessInstance for this database
ISmallBusinessInstance instance =
loader.GetSmallBusinessInstance(configurationFile) as
ISmallBusinessInstance;
// Get FormsFactory for this database version
IFormsFactory formsFactory = loader.GetFormsFactory(configuration)
as IFormsFactory;
// Get redistributable object
IBussAppRedistributable redistributable =
loader as IBussAppRedistributable;
// Create a redistributable file
string pathToRedistributableFile =
redistributable.GetRedistributable(configuration);
```

Examples of interfaces, certainly not by limitation will now be provided. An example configuration interface is as follows:

```
public interface IConfiguration
{
    string ServerName { get;set;}
    string DatabaseName { get;set;}
}
```

An example connector interface is as follows:

```
public interface IConnector
{
    Version RequiredAssemblyVersion { get;}
    Version RequiredBuildVersion { get;}
    int RequiredSchemaNumber { get;}
    CultureInfo RequiredCulture { get;}
    /// <summary>
    /// Returns the configuration information that was used to instantiate
    this connector.
    /// </summary>
    /// <returns>IConfiguration object.</returns>
    IConfiguration GetConfiguration();
}
```

An example loader interface is as follows:

```
public interface ILoader
{
    /// <summary>
    /// Gets a connector for the database referenced in the specified configuration file.
    /// </summary>
    /// <param name="configurationFile">Configuration file which contains
    /// the database name and server name.</param>
    /// <returns>An object that implements IConnector.</returns>
    IConnector GetConnector(string configurationFile);
```

```
/// <summary>
/// Gets a connector for the database for the database
/// referenced in the specified configuration.
/// </summary>
/// <param nane="configuration">Configuration pointing to a database and server.</param>
/// <returns>An object that implements IConnector.</returns>
IConnector GetConnector(IConfiguration configuration);
/// <summary>
/// Gets a connector for this database and server.
/// </summary>
/// <param name="databaseName">The database to get a connector for.</param>
/// <param name="serverName">The server that contains the database.</param>
/// <returns>An object that implements IConnector.</returns>
IConnector GetConnector(string databaseName, string serverName);
/// <summary>
/// Get an object that can be used to retrieve all Business Application related objects.
/// The Business Application objects are already initialized and logged on.
/// </summary>
/// <param name="configurationFile">Configuration file which contains
/// the database name and server name.</param>
/// <returns>An object that implements the IBussAppObjects interface.</returns>
IBussAppObjects GetBussAppObjects(string configurationFile);
/// <summary>
/// Get an object that can be used to retrieve all Business Application related objects.
/// The Business Application objects will be initialized and logged on.
/// </summary>
/// <param name="configuration">Configuration pointing to the database and server.</param>
/// <returns>An object that implements the IBussAppObjects interface.</returns>
IBussAppObjects GetBussAppObjects(IConfiguration configuration);
/// <summary>
/// Get an object that can be used to retrieve all Business Application related objects.
/// The Business Application objects will be initialized and logged on.
/// </summary>
/// <param name="databaseName">A database to connect to.</param>
/// <param name="serverName">A server that contains the database to connect to.</param>
/// <returns>An object that implements the IBussAppObjects interface.</returns>
IBussAppobjects GetBussAppObjects(string databaseName, string serverName);
}
```

In one embodiment, a loader interface includes a "launcher" method configured to launch the version of the application that corresponds to a particular database. For example, the launcher method will illustratively launch the application with the database open that is passed in to the method.

In one embodiment, an application objects interface is implemented and is illustratively an object that is returned from the loader. This interface illustratively includes the properties for getting certain particular object such as, but not limited to, FormsFactory objects, ReportsEngine objects, etc. For example,

```
public interface IApplicationObjects
{
    ///<summary>
    ///Gets a logged on ApplicationInstance.
    ///</summary>
    object Application Instance {get;}
    ///<summary>
    ///Gets an initialized FormsFactory
    ///</summary>
    object FormsFactory {get;}
    ///<summary>
    ///Gets the report engine
    ///</summary>
    object ReportEngine {get;}
}
```

The advantage of this type of interface is that it will abstract the caller from the implementation of those objects. For example, before using ApplicationInstance, there needs to be a call on a LogOn method, and before using the FormsFac-tory, there needs to be a call on Initialize. These methods are illustratively called automatically by the Loader so that the caller isn't required to know about the implementation detail. Further, changes can be made to the implementation without causing disruption. This is an additional level of abstraction.

Figure 5:
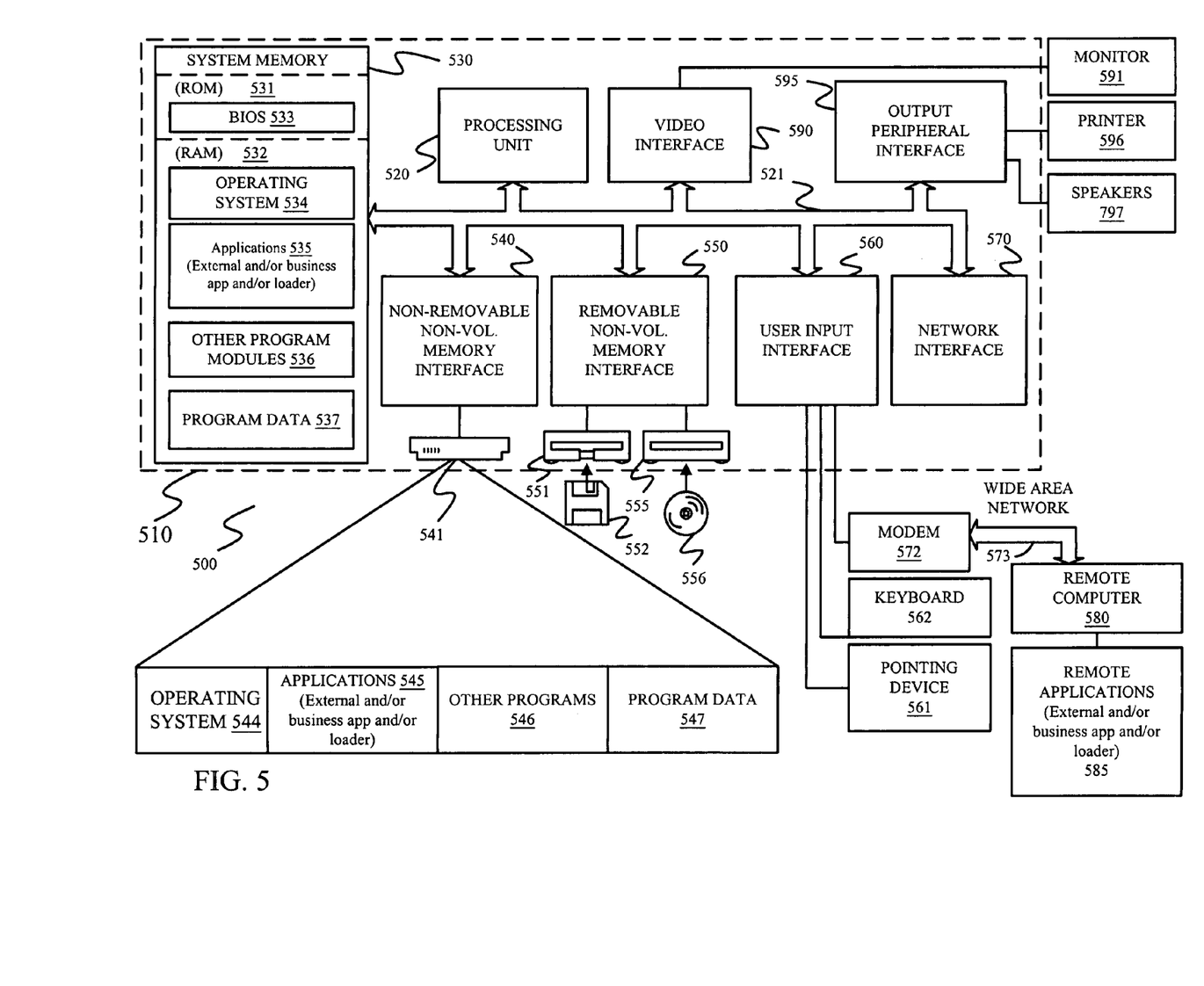
FIG. 5 illustrates an example of a computing system environment.

FIG. 5 illustrates an example of a suitable computing system environment 500 in which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments have been described herein in the general context of computer-executable instructions, such as program modules, being executed by a computer. Generally, program modules include routines, programs, objects, components, data structures, etc. that perform particular tasks or implement particular abstract data types. Embodiments can be practiced in distributed computing environments where tasks are performed by remote processing devices that are linked through a communications network. In a distributed computing environment, program modules can be located on both (or either) local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537. As is indicated, programs 535 may include an external application and/or a business application and/or a loader mechanism, such as those components as have been described in relation to FIGS. 1-4.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. As is indicated, programs 545 may include an external application and/or a business application and/or a loader mechanism, such as those components as have been described in relation to FIGS. 1-4.

A user may enter commands and information into the computer 510 through input devices such as a keyboard 562 and a pointing device 561, such as a mouse, trackball or touch pad. Other input devices (not shown) may include a joystick, game pad, microphone, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The logical connection depicted in FIG. 5 is a wide area network (WAN) 573, but may also or instead include other networks. Computer 510 includes a modem 572 or other means for establishing communications over the WAN 573, such as the Internet. The modem 572, which may be internal or external, may be connected to the system bus 521 via the user-input interface 560, or other appropriate mechanism.

By way of example, and not limitation, FIG. 5 illustrates remote application programs 585 as including functionality for the support of remote payment processing. As is indicated, programs 585 may include an external application and/or a business application and/or a loader mechanism, such as those components as have been described in relation to FIGS. 1-4.

It is worth emphasizing that inclusion of a payment interface entity 112 in the payment process is not critical to the present invention. A system including entity 112 is provided as but one example of a system within the scope of the present invention. Any system wherein application 102 communicates with a payment provider, whether directly or indirectly through another entity or entities, is within the scope of the present invention. It is interesting that submission identifier information is preserved to the bank or banks. The path taken to the bank or banks is not critical to the present invention. All such paths are within the scope of the invention, whether specifically described herein or not.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of supporting version management, the method comprising:
   receiving a request from a first software application;
   selecting and loading, from a plurality of assemblies that are each of a different version of a second software application, a particular assembly that corresponds to the request and is a version-specific assembly specific to a particular one of the different version of the second software application, wherein selecting comprises selecting without regard to which version of the second software application the first version of the software application is configured to support;
   utilizing the particular assembly to obtain or generate a particular object that is of a particular version of the second software application that is one of said different versions; and
   returning the particular object to the first software application in response to the request despite the fact that the first software application does not support interfaces of the particular version of the second software application, the particular object being multi-version compatible in that it is configured to be cast in accordance with multiple of the different versions of the second software application.

2. The method of claim 1, wherein the particular object is part of a particular one of the different versions of the second software application, the first software application lacking an interface necessary to cast the particular object as part of the particular one of the different versions.

3. The method of claim 1, wherein selecting and loading the particular assembly comprises selecting and loading a report factory.

4. The method of claim 1, wherein selecting and loading the particular assembly comprises selecting and loading a form factory.

5. The method of claim 1, wherein receiving comprises receiving through a loader interface.

6. A computer-implemented method of supporting version management, the method comprising:
   receiving a request from a software application;
   based on the request, selecting and loading an assembly that is part of a latest software version, wherein selecting comprises choosing the assembly over a corresponding assembly included in an earlier software version despite the software application not having interfaces for casting objects in accordance with the latest software version, and wherein the assembly is version-specific in that it is specific to the latest version;
   utilizing the assembly that is part of the latest software version to obtain a particular object; and
   returning the particular object to the software application in response to the request, the particular object being multi-version compatible in that it is configured to be cast in accordance with multiple of the different versions of the software application.

7. The method of claim 6, wherein selecting comprises selecting without a definite indication as to whether the software application has been updated to support the latest software version.

8. The method of claim 6, returning the particular object comprises returning the particular object regardless of whether or not the software application has or has not been updated to support the latest software version.

9. A computer-implemented method of supporting version management, the method comprising:
   receiving a request from a software application;
   based on the request, selecting and loading an assembly that is part of a latest software version, wherein selecting comprises choosing the assembly over a corresponding assembly included in an earlier software version despite the software application not having been updated to support the latest software version, and wherein the assembly is version-specific in that it is specific to the latest software version;
   utilizing the assembly that is part of the latest software version obtain a particular object; and
   returning the particular object to the software application in response to the request, the particular object being multi-version compatible in that it is configured to be cast in accordance with multiple of the different versions of the software application.

10. The method of claim 9, wherein selecting comprises selecting without a definite indication as to whether the software application has been updated to support the latest software version.

11. The method of claim 9, returning the particular object comprises returning the particular object regardless of whether or not the software application has or has not been updated to support the latest software version.

* * * * *